United States Patent [19]

Husher

[11] Patent Number: 5,068,654

[45] Date of Patent: Nov. 26, 1991

[54] COLLISION AVOIDANCE SYSTEM

[75] Inventor: Fredrick K. Husher, Albuquerque, N. Mex.

[73] Assignee: Hazard Detection Systems, Colorado Springs, Colo.

[21] Appl. No.: 374,841

[22] Filed: Jul. 3, 1989

[51] Int. Cl.[5] .......................... G08G 1/16; G01S 3/02
[52] U.S. Cl. ................................... 340/903; 340/988;
340/991; 340/992; 340/825.14; 340/825.54;
340/436; 455/51; 455/54; 455/56; 180/167;
342/455; 342/457
[58] Field of Search ..................... 340/903, 991–994,
340/988, 989, 435, 436, 505, 825.54, 825.69,
825.72, 825.06–825.14, 825.55; 455/11, 51, 53,
54, 56, 89; 180/167, 168; 375/107; 342/29–31,
41, 42, 455, 457

[56] References Cited

U.S. PATENT DOCUMENTS

| | | | |
|---|---|---|---|
| 3,345,633 | 10/1967 | Runge | 342/29 |
| 3,566,404 | 2/1971 | Sorkin | 342/31 |
| 3,691,559 | 9/1972 | Jackson | 342/31 |
| 3,984,806 | 10/1976 | Tyler | 340/992 |
| 4,680,582 | 7/1987 | Mejia | 340/825.14 |
| 4,694,294 | 9/1987 | Suzuki et al. | 340/825.14 |
| 4,797,948 | 1/1989 | Milliorn et al. | 340/991 |
| 4,850,032 | 7/1989 | Freeburg | 455/51 |

Primary Examiner—Donnie L. Crosland
Attorney, Agent, or Firm—Foley & Lardner

[57] ABSTRACT

A collision avoidance system providing to each properly equipped vehicle an indication of the locational direction, heading, and relative velocity of other similarly equipped vehicles or stationary objects. Each vehicle in the system is equipped with a transponder module which transmits information data relating to that vehicle, and receives information data relating to the other similarly equipped vehicles. A central reference time signal transmitter is provided for transmitting a reference timing signal which effectively synchronizes each of the transponder modules. Upon receiving the reference timing signal, the transponder module subsequently transmits information data relating to that particular vehicle. Each of the transponder modules is allocated a unique time period for transmission of its information data. Thus, the system can accommodate a great number of transponder modules within the system, each transmitting their respective information data during unique time slots during a relatively small time frame.

12 Claims, 6 Drawing Sheets

COLLISION AVOIDANCE SYSTEM

BACKGROUND OF THE INVENTION

This invention relates to a cooperative type vehicle collision avoidance system and particularly relates to such systems as can be used upon vehicles for the prevention of collisions.

Several different types of position detecting and control systems for vehicles have been developed for the purpose of preventing one object from striking another. The prior art systems for the most part include devices which are adapted to a vehicle and which continuously transmit and receive radio frequency signals. Each vehicle is also equipped with an antenna unit which receives the transmitted signals from the vehicles within the range of the transmitting vehicle. The received signals are processed and information relating to the position of the transmitting vehicle is determined and is presented to the operator of the receiving vehicle. Examples of this kind of system are disclosed in U.S. Pat. No. 3,235,025 issued to Quinn, U.S. Pat. No. 3,293,600 issued to Gifft, and U.S. Pat. No. 4,030,088 issued to McCullough. Similar systems have also been disclosed for use in aircraft in U.S. Pat. No. 3,345,633 issued to Runge and U.S. Pat. No. 4,298,875 issued to Sullivan.

These systems and other similar prior art collision avoidance systems are limited in their usefulness in an environment where there are several vehicles within the relative proximity of one another. The prior art systems for the most part fail to provide a system which clearly distinguishes the signals transmitted by several vehicles or objects and prevents possible interference of signals received simultaneously by a particular vehicle within the system. The prior art simply does not address the situations wherein a great multitude of vehicles or objects within the same proximity transmit their respective signals in a manner which ensures that the received signals can be attributed to a unique vehicle which is in a dangerous proximity of colliding with another vehicle or object.

SUMMARY OF THE INVENTION

The collision avoidance system (CAS) according to the present invention detects, and warns properly equipped vehicle operators about other moving or stationary objects which are also equipped that might present collision hazards. The system is based on cooperative communication between identical electronics systems attached to the equipment of concern. The system incorporates highly automated radio (telemetry) electronics in order to simplify the operators' use of the system while assisting the operators in avoiding collisions as effectively as possible.

Accordingly, it is an object of the present invention to overcome the shortcomings of the prior art collision avoidance systems by providing a system which can detect directional, heading, and relative velocity information of many other vehicles within the system.

A further object of the present invention is to provide a collision avoidance system wherein each properly equipped vehicle of the system transmits its information data in unique time slots allocated to each and every vehicle of the system in a very small time frame so as to effectively provide continuous processing of all vehicles essentially simultaneously.

A still further object of the present invention is to provide a collision avoidance system which can clearly distinguish between signals transmitted by various vehicles within a close proximity due to each vehicle transmitting its signal during the unique time slot for that vehicle.

Each vehicle of the system is equipped with a collision avoidance transponder module for transmitting and receiving data from the other vehicles. A central reference time signal generator is provided at a neutral position in order to continuously transmit a periodic reference timing signal for reception at the transponder modules associated with each vehicle. Upon the transponder module receiving the reference timing signal, each transponder module subsequently transmits information data relating to that vehicle for reception by the other equipped vehicles. Each of the transponder modules is allocated a specific time slot or period which is unique to that vehicle for transmission of the information data. Accordingly, the system is operable for providing collision avoidance data for a great number of vehicles.

These, together with other objects and advantages which will become subsequently apparent, reside in the details of construction and operation as more fully hereinafter described and claimed, reference being had to the accompanying drawings forming a part hereof.

DETAILED DESCRIPTION OF THE PREFERRED EMBODIMENTS

Figure 1:
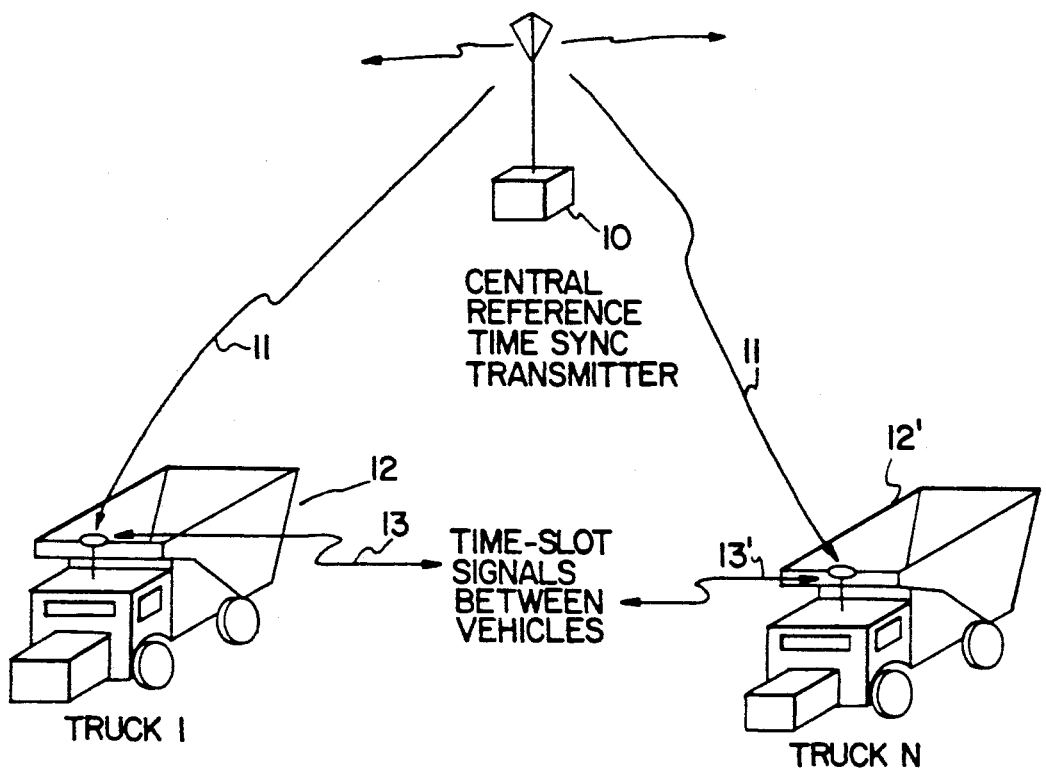
FIG. 1 is a plan view of vehicles within the collision avoidance system of the present invention.
Figure 2:
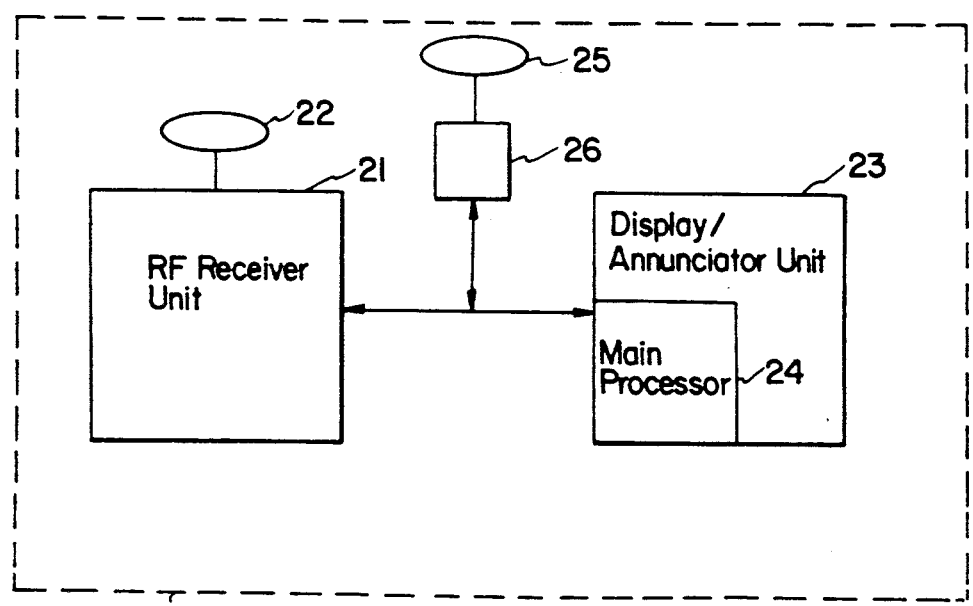
FIG. 2 is a block diagram of the collision avoidance transponder module.

The CAS relies on interactive communication between the radio electronics which are installed in vehicles 12, 12' utilizing the system. As illustrated in FIGS. 1 and 2, a centrally located, fixed central reference time sync transmitter 10 emits a repetitive reference timing sync signal 11 which is used to initiate the operation cycle of each CAS transponder module. Those modules within receiving range of the reference timing signal become synchronized with one another and begin execution of their programs. Only those modules which have received a reference timing sync signal 11 will be included within the operational cycle.

Upon being enabled in response to the reception of the reference timing sync signal 11, each of the CAS transponder modules 20 associated with the vehicles 12, 12' transmits a response to the reference timing sync signal 11 through a multi-element, omni-directional antenna 25 which is dedicated for transmitting. The signal from each CAS transponder module 20 occurs during a unique time window to allow unimpeded recognition of the particular transmitting transponder module to the other transponder modules. Additional information can be coded on the transponder module transmissions in order to provide identification of the vehicle or object to those around the transmitting vehicle. This operational cycle is repeated on a regular basis so that collision avoidance is essentially continuous at all times.

The CAS transponder module 20 includes a radio frequency (RF) processing unit 21 with a multi-element, multi-directional antenna 22 dedicated for receiving. The RF processing unit 21 listens for the reference timing sync signal 11 and subsequently the emissions of all the other transponder modules 20 in the system. Since incoming signals from other transponder modules 20 can arrive at more than one of the antenna segments during a time slice, the direction of the other transponder module 20 can be interpolated by measuring the signal strength of each of the receiver antenna 22 segments. The range or distance to the other transponder module 20 is determined by the signal strength of the other signal emission. To ensure range distance consistency between the CAS transponder modules 20, each transmitter 26 output power level is controlled by a feedback circuit (not shown). The use of unique time-slots for each CAS transponder transmission allows for multiple hazards to be processed essentially simultaneously.

The CAS transponder module 20 is basically constructed in two assemblies; a display/annunciator unit 23 and the RF processing unit 21. The operator sees and/or hears information from the display/annunciator unit 23 attached to the vehicles 12, 12' control panel. Distance, direction, and relative velocity for hazards are displayed to the operator in an appropriate form. Warnings are given at increasing intensity levels as the severity of a hazard increases. The RF processing unit 21 contains the transmitter antenna 26 and receiver antenna 22 arrays, RF signal processing, and digital communications link to the display/annunciator unit. Trajectory calculations, display control and update, and other major functions for each CAS transponder module 20 are performed by a microcomputer (main processor 24) contained within the display/annunciator unit 23.

The main processor 24 stores and updates data regarding the received signal strength, direction, heading, and relative velocity of any distant transponder noted as a hazard. It can detect any unusual change in these parameters and display an appropriate indication to the operator of the equipped vehicle. For example, this capability allows for alerting the operator if another vehicle has approached so closely that it is in a "shadow" zone and cannot be continuously monitored by the system due to signal blockage. In such a case a high level alarm is activated to draw the operator's attention to this hazard, and the last known position and direction are indicated. If the hazard vehicle's signal is subsequently detected in a new position, the processor 24 can compute the intervening vehicles trajectory combined with the expected signal strength utilizing specifically designed software and thus discriminate against spurious randomly reflected signals.

Figure 3:
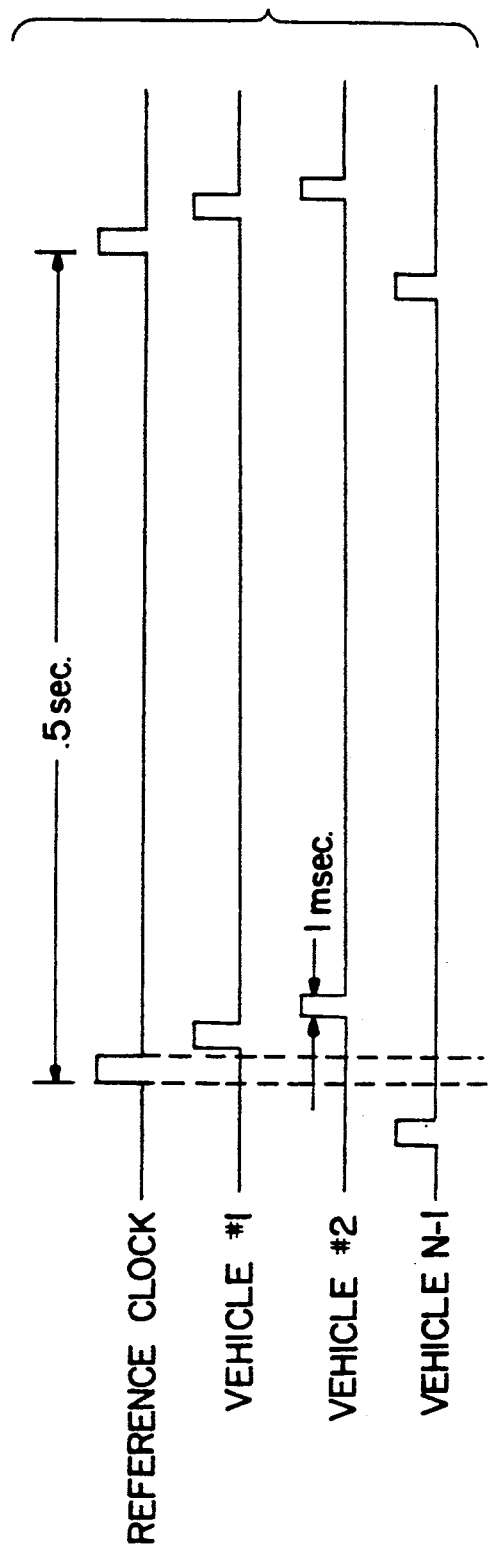
FIG. 3 is a timing diagram of the collision avoidance system time-slot structure.

The centrally located reference timing sync transmitter 10 emits the reference timing sync signal 11 once every 0.5 second. This reference timing sync signal 11 is recognized by all of the CAS transponder modules 20 in the system and causes each transponder module 20 to transmit for a time slice period after a preset time offset, as illustrated in FIG. 3. To ensure that the vehicles 12, 12' which are within a operating range with respect to one another do not cause friendly interference, each vehicle has a preset time slice period during which it alone will transmit. Each time slice period is 1-msec in duration, allowing several hundred vehicles to be active within the CAS at virtually the same time. The RF receiver unit 21 within each transponder module 20 observes at each transmit time slic period for signal presence and direction. The range or distance to another CAS transponder module 20 is determined by the received signal strength, as each signal transmission is maintained at a fixed power level during its transmission. The distance between the transmitting and receiving transponder module 20 is then related to the square root of the transmitted signal relative to the received signal strength. A slave processor (57 of FIG. 5) then computes the distance and position data which is passed to the main processor 24 through a serial data link.

Figure 4:
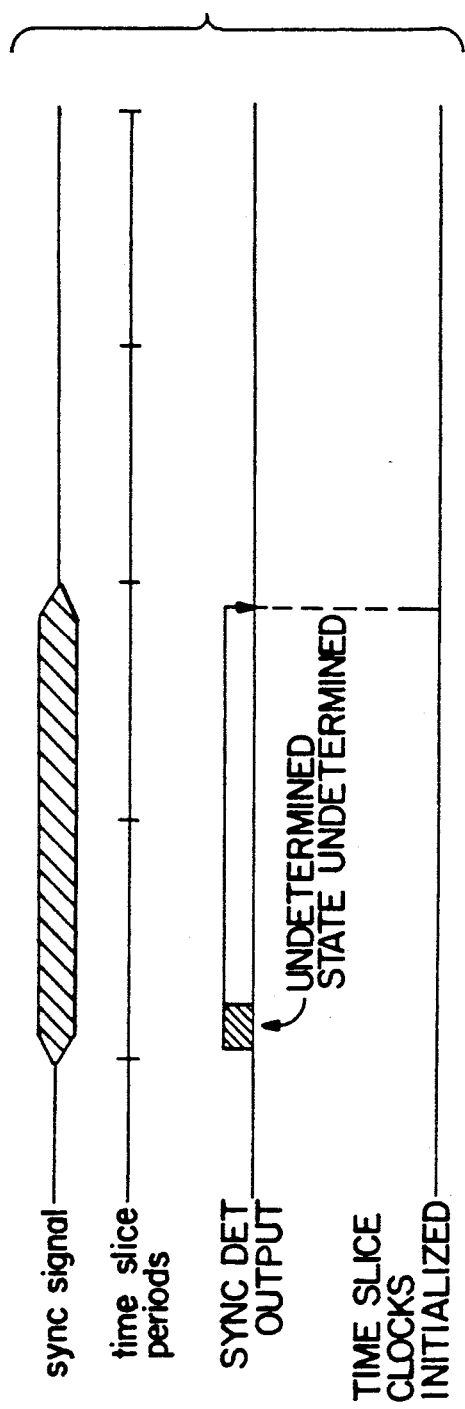
FIG. 4 is a diagram of the reference timing sync signal.

The reference timing signal sync transmitter 10 utilizes a signal whose duration is twice that of any of the transponder module 20 time slice periods. This signal is utilized by all of the transponder modules 20 within receiving range in order to initialize their internal clocks, thus ensuring that no transponder module 20 will transmit except within their respective assigned time slice periods or windows. The reference timing sync signal 11 is illustrated in FIG. 4.

Included with the sync signal envelope is an ID code which identifies the signal as a valid sync signal. The ID code is processed through FM decoding circuits and modem such that the amplitudes of this envelope are maintained above 80% of that captured by the peak detector for at least 1.5 time slice periods. When the signal has remained on for greater than the 1.5 periods, the slave processor 57 will be triggered and the time slice clock reinitialized.

The CAS RF receiver unit 21 is of the broadband direct conversion type which utilizes a horizontally polarized antenna array with multiple detectors. FIG. 4 illustrates the detailed block diagram of the RF transponder module 20 assembly. The receiver antenna 51 is composed of a ring of up to 16 antenna segments or elements each having an aperture being as small as 22.5 degrees. Each antenna segment has a tunnel diode (TD) detector and video preamplifier. The outputs of the preamplifiers are individually multiplexed by video multiplexer 52 and self-test MUX 53 to pass through a 5-stage log video amplifier 54. The overall performance of the 5-stage log video amplifier should allow for 50 dBm of dynamic range with +/−1dBm accuracy or 500 feet of threat depth with 10 foot resolution. Temperature control is needed to both maintain the front and conversion efficiency and the log amp transfer response over the range of −10 to 100 degrees C. The slave microprocessor 57 digitizes each of the receiving zones associated with the antenna segments for signal strength using a peak detector 55 and analog to digital converter (ADC) 56 during each time slice period. Additionally, the RF signal from each antenna is combined together and processed through a saturating RF amplifier. The leveled RF output of the saturating RF amplifier is mixed with a local oscillator signal at 1260 MHz in order to generate an IF term at 60 MHz. The sum term from the mixer is terminated within a diplexer. The 60 MHz IF signal is then presented to the discriminator which translates the frequency modulated signal to an audio signal for use by the modem. This decoded signal contains the ID code of the threatening vehicle or object along with spare data bits for use in future applications. Thus, along with determining the distance and direction of the threatening vehicle or object, the ID code can inform the operator as to what the object is. Upon initial power up, the RF assembly remains silent until the reference timing sync signal 11 is found. The reference timing sync signal 11 is recovered by the sync detector 50 and modem 59, where upon it is processed by the slave processor 57. The synchronization occurs at the falling edge of the timing sync signal envelope. Self tests of the receiver circuitry include front end and log amp as described infra, and DC tests for log amp conversion transfer response.

Figure 5:
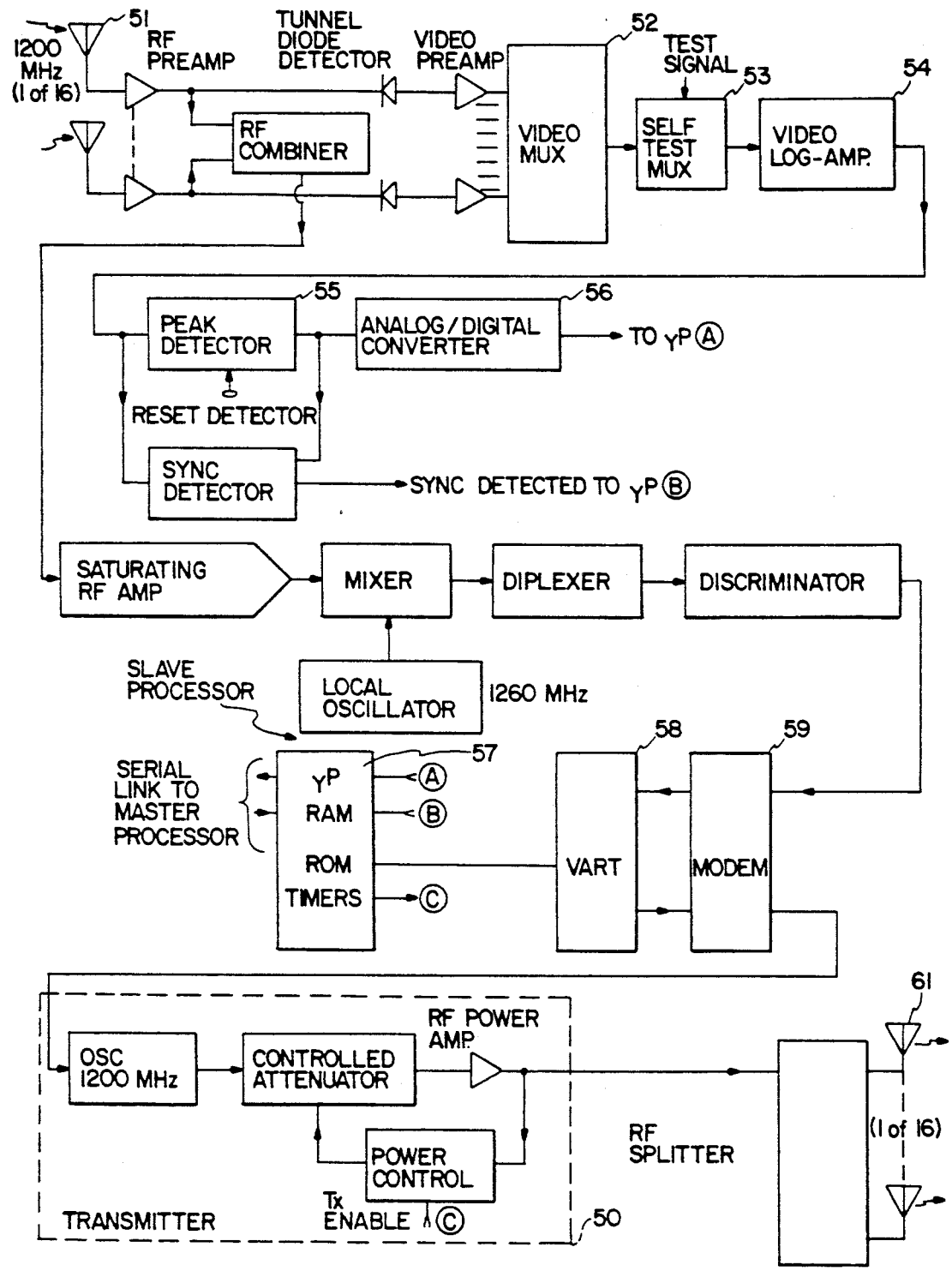
FIG. 5 is a detailed block diagram of the collision avoidance transponder module of the present invention.
Figure 6:
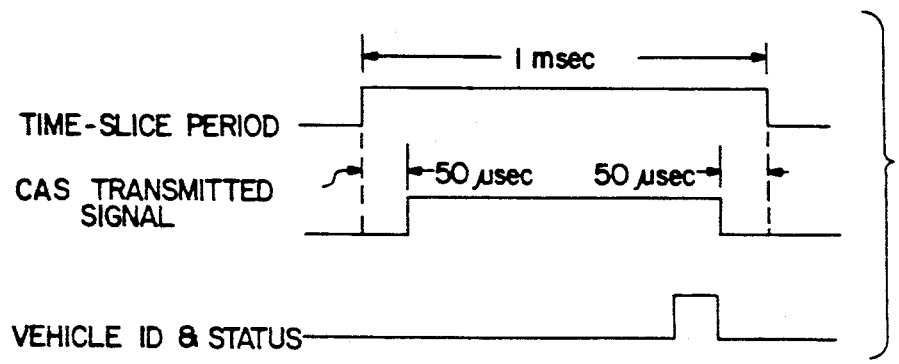
FIG. 6 is a typical timing diagram of a transmitted signal with the vehicle data.

The transmitter portion of the RF assembly shown in FIG. 5 performs two roles, the first for transmitting the time slice period, and the second for later use with frequency modulated (FM) serial data. The transmitter antenna 61 is similar to the receiver antenna 51 as it includes a ring of up to 16 horizontally polarized elements. The elements are fed in phase to achieve an omni-directional transmitted signal. The FM signal is frequency shift keyed (FSK) by the modem 59 with the output of the UART 58. The 1-msec time slice period effectively AM modulates the transmitter on with the output power stabilized using feedback from a directional coupler. The output power is stabilized to $+/-0.5$ dB by controlling a PIN diode array placed between the driver and power amplifier stages. Near the end of the time slice period the transmitter 60 sends an FSK signal which identifies the vehicle and its associated status information. FIG. 6 illustrates the signal typical of a time-slice transmission period. As shown, the actual CAS transmitted signal is 100 microseconds shorter than the allowed 1 msec time slice period. This tolerance provision ensures that the transmitting transponder module 20 will not transmit in another transponder module's time slice period.

The modem 59 is configured such that a data clock and the data itself are used to create the signal. By so doing, the modem 59 is unaffected by Doppler effects caused by the vehicles being in motion relative to each other. The receiver portion of the modem 59 can thus align itself to the audio developed by the discriminator output. The coding of the modem signal is losely based, the Manchester coding scheme being utilized but with a packing technique to reduce the bandwith of the audio relative to the data or baud rate generated by the universal asyncronous receiver transmitter (UART) 58.

Figure 8:
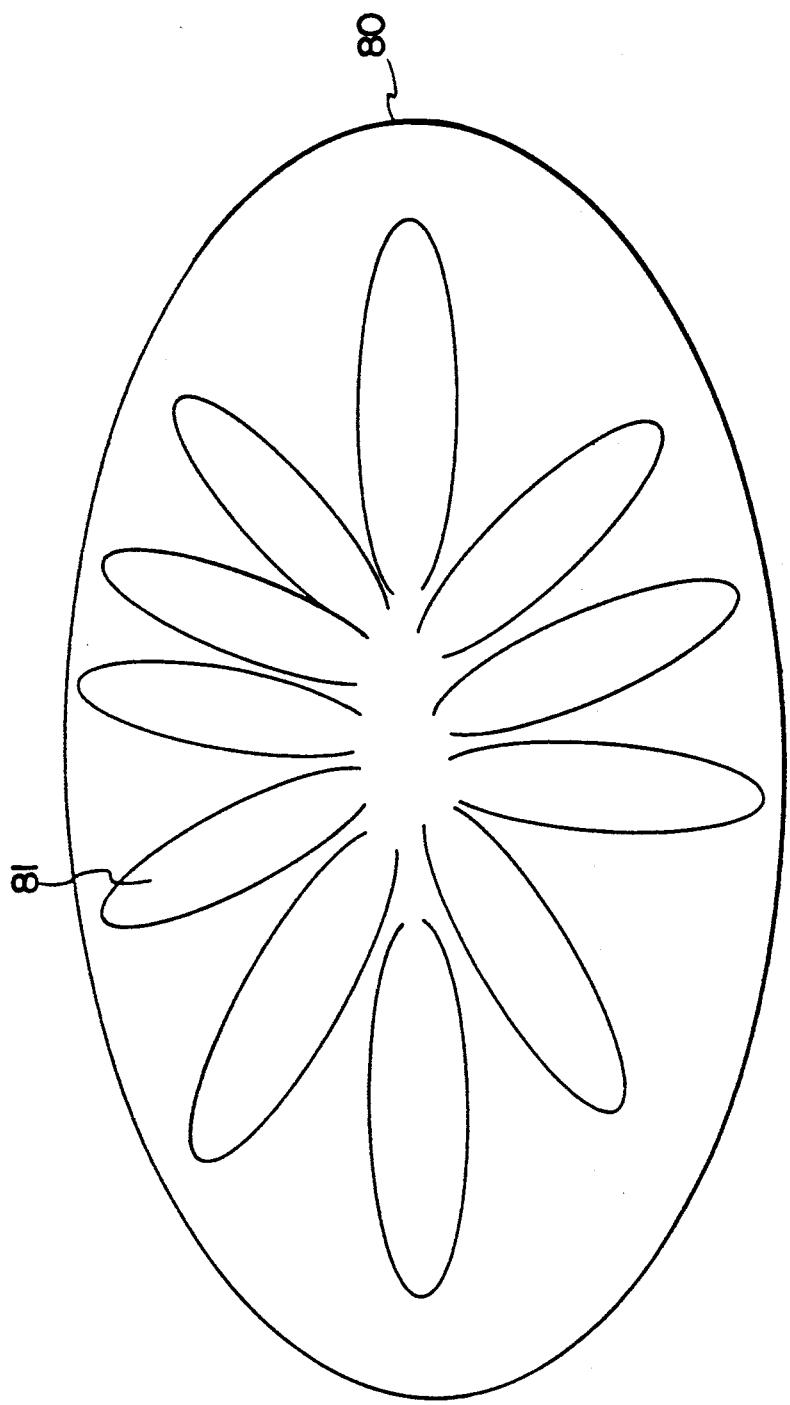
FIG. 8 is a plan view of the multi-element antenna disk of the present invention.

The proposed antennas 51, 61 for the CAS are similar to those used at much higher frequencies by military shipborne Anaren D-ESM receivers. FIG. 8 illustrates the antenna configuration 80. Each lobe 81 of the antenna acts as a log-periodic array which is reduced in size due to the high dielectric medium which will encapsulate the metallized pattern of the antenna 80. Additional metallization is applied to the exterior of the antenna dielectric to limit the vertical radiation component of the antenna array.

Figure 7:
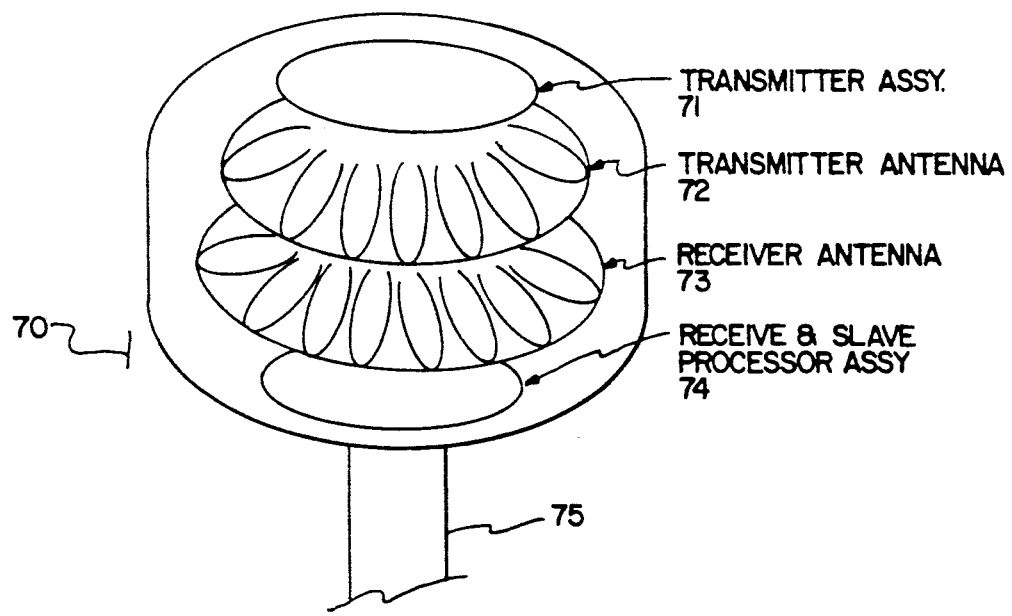
FIG. 7 is a cut-away view of the masthead unit of the present invention.

As shown in FIG. 7, the receiver and transmitter antenna disks 72, 73 are stacked vertically. This configuration allows for a self-test benefit by measuring the leakage of the transmitted signal into the receiver input. All of the RF receiver unit 21 segments (detector, preamp, and mux) can thus be checked against the transmitter 60 output. By using horizontal polarization, two potential system problems are overcome: flight navigation signals and multipath signals. The first problem is overcome as the flight navigation signals are vertically polarized and above the CAS antenna array 51, 61 resulting in a minimum of $-20$ dBm of rejection. Further indifference is achieved due to the low conversion efficiency of a direct conversion receiver, typically 60 dB. The second problem is reduced due to the relatively small aperture of each antenna element or lobe 81 and the post signal processing of the slave microprocessor 57. With a small aperture on the antenna 80, very little side lobe sensitivity will be present. A reflected signal would manifest itself as a smaller amplitude waveform detected at another of the segment antennas, due to the longer signal path.

The RF assembly 71, 74 along with the antennas 72, 73 are ideally mounted on a masthead 70 which is attached to the vehicle 12. The masthead 70 will appear as a flattened sphere supported by a semi-rigid mast 75 so as to maintain the head in a vertical position unless an external force is applied, such as a falling boulder, wherein the mast 75 would tilt over until the force is removed. The diameter of the flattened sphere is 1 ft. with a vertical height of 8–10 inches. The mast 75 is 2 inches in diameter and hollow to allow the signal and power cables to pass through and be protected. The exterior of the masthead 70 will be formed using a type of fiberglass like material held by a non-RF absorbing binder.

The display/annuciator unit 23 consists of the main processor 24, and a display/annunciator assembly (not shown). The main processor 24 synchronizes a local system clock, tracks the position of the other vehicles within the range of the system, and uses the display/annunciator assembly to inform the vehicle operator of potential hazards.

Information collected by the slave processor 57 in the masthead 70 is transferred to the main processor 24 during each operational cycle of the CAS system. The transferred data includes distance, location, heading, relative velocity, ID code, and whatever additional status that is sent by the target vehicle. The data is then integrated with that data collected earlier in order to develop the trajectories of the vehicles 12, 12' which pose a threat. The validity of the data is determined to provide additional screening of spurious readings that may result from interference, antenna shadowing, and RF signal reflections. When a threat becomes significant, the vehicle operator is informed in an appropriate manner consistent with the threat level.

The display portion of the display/annunciator assembly can be of the form of a plasma display matrix. This type of display operates well in both bright light and night-time situations. Typical applications of this display currently include personal computers and computer terminals. The annunciator portion of the display/annunciator assembly can be of the form of a commercially available annunciator which will provide a sound or vocal alarm to the operator.

A possible expansion of the system can include positioning control of a truck by a crane for loading or a hopper for dumping. The expansion requires the addition of narrow bandwidth control receiver and a position display for the driver. The receiver will have the ability to change frequencies to accommodate several trucks and cranes operating within close proximity of each other. In normal mode the receiver stays parked at the command frequency until directed to move by the crane. Using the existing transmitter within the CAS the crane can receive the position and vehicle type data upon approach thereto, thus it can direct the vehicle when ready. The crane feeds a steady stream of data to the truck to manage the driver's display while directing the vehicle into position.

Another possible expansion of the system can include use of the CAS with a driverless vehicle having an inertial guidance system. This would include an environment having driver and non-driver controlled vehicles operating within the same area or a solely driverless environment. The CAS unit could also be used in conjunction with a driverless vehicle having an inertial guidance system to reestablish the position of the vehicle in the guidance system map of the operating area. The CAS can be adapted to any known driverless vehicle systems including the systems disclosed in U.S. Pat. No. 4,818,171 issued to Burkholder, U.S. Pat. No. 4,817,000 issued to Eberhardt, U.S. Pat. No. 4,706,773 issued to Reinaud, U.S. Pat. No. 4,659,971 issued to Melocik, and U.S. Pat. No. 4,284,160 issued to DeLiban.

The foregoing is considered as illustrative only of the principles of the present invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed is:

1. A system which comprises:
    transmitting means for continually transmitting a reference signal at a predetermined time interval;
    a plurality of ground based transponder means for transmitting, in response to receipt of said reference signal, respective data signals at a common predetermined signal strength with horizontal polarization during different unique time periods following reception of said reference signal, each said transponder means being operative for receiving data signals transmitted by other transponder means in said system;
    processor means coupled to each said transponder means for processing position status information including range information derived from signal strengths of said received data signals relative to said predetermined signal strength to provide about 10 feet of resolution at a range of 500 feet; and
    indicating means coupled to each said processor means for indicating a collision threat to an operator based on said range information.

2. A collision avoidance system as claimed in claim 1, wherein said transmitted information data is shorter in duration than said specified time period so as to ensure transmission of said information data during only the specified time period designated for said object.

3. A collision avoidance system as claimed in claim 2, wherein said transmitting means comprises a multi-element antenna which transmits signals in an omni-directional manner.

4. A collision avoidance system as claimed in claim 2, wherein said receiving means comprises a multi-element antenna which receives signals in a uni-directional manner, said receiving means including a multiplexor for passing the signals received by each element of the antenna to said processing means in seriatim.

5. A collision avoidance system as claimed in claim 1, wherein said object is a vehicle and said other similarly equipped objects are moving vehicles or stationary objects.

6. A collision avoidance system as claimed in claim 1, wherein said object is a driverless vehicle having an inertial guidance system.

7. A collision avoidance system, comprising:
    a central generator means for continuously and periodically generating and transmitting a reference signal along a transmission path;
    receiving means associated with a ground based object for receiving said reference signal generated by said central generator means;
    transmitting means associated with said ground based object for transmitting along said transmission path and in a specified time period after receipt of said reference signal a horizontally polarized signal containing information data relating to said ground based object in response to said receiving means receiving said reference signal, said receiving means also being operative for receiving information data transmitted by other similarly equipped ground based objects during different specified time periods after receipt of said reference signal;
    processing means associated with said first mentioned ground based object for processing said received information data from said other similarly equipped ground based objects so as to derive the positional location of said other similarly equipped ground based objects with respect to said first mentioned ground based object with a resolution of about 10 feet at a range of 500 feet; and
    indicating means associated with said first mentioned ground based object for indicating to an operator of said first mentioned ground based object a collision threat based on the positional location of said other similarly equipped ground based objects.

8. A collision avoidance system as claimed in claim 7, wherein said receiving means and said transmitting means are configured in a single housing so as to be vertically adjacent to one another.

9. A collision avoidance system as claimed in claim 7, wherein said processing means derives said positional location of said other similarly equipped objects according to signal strength of the received information data transmitted by the other similarly equipped objects.

10. A collision avoidance system as claimed in claim 9, wherein said positional location includes distance and direction of the other similarly equipped objects with respect to said object, said processing means further being operative for deriving relative velocities of said other similarly equipped objects from said received information data.

11. A collision avoidance system as claimed in claim 7, wherein said reference signal is an amplitude modulated signal and said information data is a frequency shift keyed signal.

12. A method of avoiding collisions, comprising the steps of:
    continuously generating a reference signal through a transmission path at a predetermined cadence from a central location;
    receiving said reference signal at a receiver unit associated with surface vehicle;
    transmitting information data from a transmitter unit associated with said surface vehicle at a specified signal level through said transmission path in response to receiving said reference signal, said transmitting taking place during a unique time slot allocated for said surface vehicle after receipt of said reference signal;

receiving information data transmitted from other similarly equipped surface vehicles through said transmission path at said specific signal level during respective allocated unique time slots;

processing said received information data with a processor associated with said surface vehicle so as to derive range information relating to the location of said other surface vehicles based on received signal levels relative to said specified signal level with a resolution of about 10 feet at a range of 500 feet; and indicating a collision threat to an operator of said surface vehicle by an indicator unit data based on said range information.

* * * * *